United States Patent [19]

Hirai

[11] Patent Number: 4,807,974

[45] Date of Patent: Feb. 28, 1989

[54] LIQUID CRYSTAL DISPLAY HAVING A DECODER BETWEEN A DRIVER AND SCAN ELECTRODES

[75] Inventor: Yoshihiko Hirai, Tokyo, Japan

[73] Assignee: NEC Corporation, Japan

[21] Appl. No.: 935,246

[22] Filed: Nov. 26, 1986

[30] Foreign Application Priority Data

Nov. 27, 1985 [JP] Japan ............................... 60-267714

[51] Int. Cl.[4] ............................................... G02F 1/13

[52] U.S. Cl. .................................... 350/332; 350/333; 340/784

[58] Field of Search ........................ 350/332, 333, 334; 340/784, 802, 804

[56] References Cited

U.S. PATENT DOCUMENTS

| | | | |
|---|---|---|---|
| 3,684,918 | 8/1972 | Schmersal | 340/718 |
| 4,145,120 | 3/1979 | Kubota | 340/718 |
| 4,233,603 | 11/1980 | Castleberry | 340/784 |
| 4,423,432 | 12/1983 | Stewart et al. | 307/463 |
| 4,427,997 | 1/1984 | Hareng et al. | 340/784 |
| 4,506,955 | 3/1985 | Kmetz | 340/784 |
| 4,636,788 | 1/1987 | Hilbrink | 340/784 |
| 4,641,135 | 2/1987 | Hilbrink | 340/784 |

FOREIGN PATENT DOCUMENTS

| | | | |
|---|---|---|---|
| 0154992 | 12/1979 | Japan | 340/718 |
| 0230112 | 12/1984 | Japan | 340/719 |

*Primary Examiner*—Stanley D. Miller
*Assistant Examiner*—Tai Van Duong
*Attorney, Agent, or Firm*—Ostrolenk, Faber, Gerb & Soffen

[57] ABSTRACT

In a matrix-type liquid crystal display driven by a driver, a scan decoder has a first number of input terminals connected to the driver and a second number of output terminals connected to scan electrodes, respectively, with the first number substantially logarithmically related to the second number. Preferably, a data decoder has a third number of input terminals connected to the driver and a fourth number of output terminals connected to data electrodes, respectively, with the third number rendered substantially equal to four times a square root of the fourth number. For the scan decoder, the driver delivers a bipolar source voltage to one of the input terminals and negative-logic and positive-logic voltages to other input terminals to make the output terminals supply a bipolar output voltage to the scan electrodes in a prescribed order. For the data decoder, the driver delivers another bipolar source voltage to one of the input terminals, L pairs of bipolar address voltages to 2L input terminals, K pairs of bipolar data signals to 2K input terminals to make the output terminals supply an output voltage to at least one data electrode at a time so that a voltage difference is applied across a liquid crystal layer at a crossover of each of the at least one data electrode and one of the scan electrodes that is applied with the output voltage from the scan decoder at that time. The third number may be substantially logarithmically related to the fourth number.

4 Claims, 9 Drawing Sheets

LIQUID CRYSTAL DISPLAY HAVING A DECODER BETWEEN A DRIVER AND SCAN ELECTRODES

BACKGROUND OF THE INVENTION

This invention relates to a liquid crystal display device of the matrix type as referred to in the art. The liquid crystal display device is alternatively referred to briefly as a liquid crystal display.

Such a liquid crystal display device is useful in a personal computer and a word processor and is driven by a driver to visually display a pattern which may be letters and/or figures. In a manner which will later be described in detail, the liquid crystal display device comprises a first and a second substrate, as of glass, a liquid crystal layer between the substrates, a plurality of scan or scanner electrodes between the liquid crystal layer and the first substrate, and a plurality of data electrodes between the liquid crystal layer and a preselected one of the substrates. It is convenient herein to understand that the driver is included in the liquid crystal display device. The scan and the data electrodes are arranged in a matrix fashion to define a great number of crossovers or dots. The liquid crystal display device has a certain display capacity which is defined by the number of dots, namely, by a product of the numbers of the scan and the data electrodes.

In a matrix-type liquid crystal display device of a large display capacity, the driver becomes complicated and must have a large number of driver outputs which should be connected to the respective scan and data electrodes. The liquid crystal display device therefore becomes expensive and has a low reliability.

Various approaches are already known to reduce the number of such driver outputs for a facsimile recorder, an image sensor, and like devices. The approaches are, however, not applicable to a liquid crystal display device for the reason which will become clear below. In fact, some of the approaches are directed toa liquid crystal display device. For example, an approach is reported by Paul R. Malmberg et al in "SID 86 Digest" as paper number 16.2 on pages 281 to 284 under the title of "Active-matrix Liquid-Crystal Display with Integrated Scanner Electronics." According to an example reported by Malmberg et al, dual-end drive is applied to a matrix-type liquid crystal display device which comprises 128 scan electrodes and 192 data electrodes, each with an about 0.51-mm center-to-center distance. The scan electrodes are driven by a cooperation of an eight-bit S/R and a sixteen-bit S/R on each side presumably through a distributor or similar device. The data electrodes are driven by a combination of sixteen-bit S/R and a twelve-bit S/R on each side probably through a distributor. In another example, only 232 driver outputs are used where 2,084 outputs would otherwise be necessary.

SUMMARY OF THE INVENTION

It is an object of the present invention to provide a matrix-type liquid crystal display device which comprises a driver having only a small number of driver outputs.

It is another object of this invention to provide a matrix-type liquid crystal display device of the type described, which is inexpensive.

It is still another object of this invention to provide a matrix-type liquid crystal display device of the type described, which is highly reliable.

Other objects of this invention will become clear as the description proceeds.

According to the invention, there is provided a matrix-type liquid crystal display device which includes a driver, a first and a second substrate, a liquid crystal layer between the substrates, a plurality of scan electrodes between the liquid crystal layer and the first substrate, and a plurality of data electrodes between the liquid crystal layer and a preselected one of the substrates. The invention includes a scan decoder placed between the substrates and on the first substrate outwardly of the liquid crystal layer. The scan decoder has a first number of scan input terminals connected to the driver and a second number of scan output terminals connected to the respective scan electrodes, the first number being substantially logarithmically related to the second number.

According to a preferred aspect of this invention, the matrix-type liquid crystal display device further comprises a data decoder between the substrates and on the preselected one of the substrates in an offset positional relation to the liquid crystal layer and the scan decoder wherein the data decoder has a third number of data input terminals connected to the driver and a fourth number of data output terminals connected to the respective data electrodes and wherein the third number is substantially equal to four times a square root of the fourth number.

According to another preferred aspect of the invention, the matrix-type liquid crystal display device further comprises a data decoder between the substrates and on the preselected one of the substrates in an offset positional relation to the liquid crystal layer and the scan decoder. The data decoder has a third number of data input terminals connected to the driver and a fourth number of data output terminals connected to the respective data electrodes, the third number being substantially logarithmically related to the fourth number.

BRIEF DESCRIPTION OF THE DRAWING

Other objects, features and advantages of the invention will be seen from the following detailed description of an embodiment thereof, with reference to the drawing, in which.

DESCRIPTION OF THE PREFERRED EMBODIMENT

Figure 1:
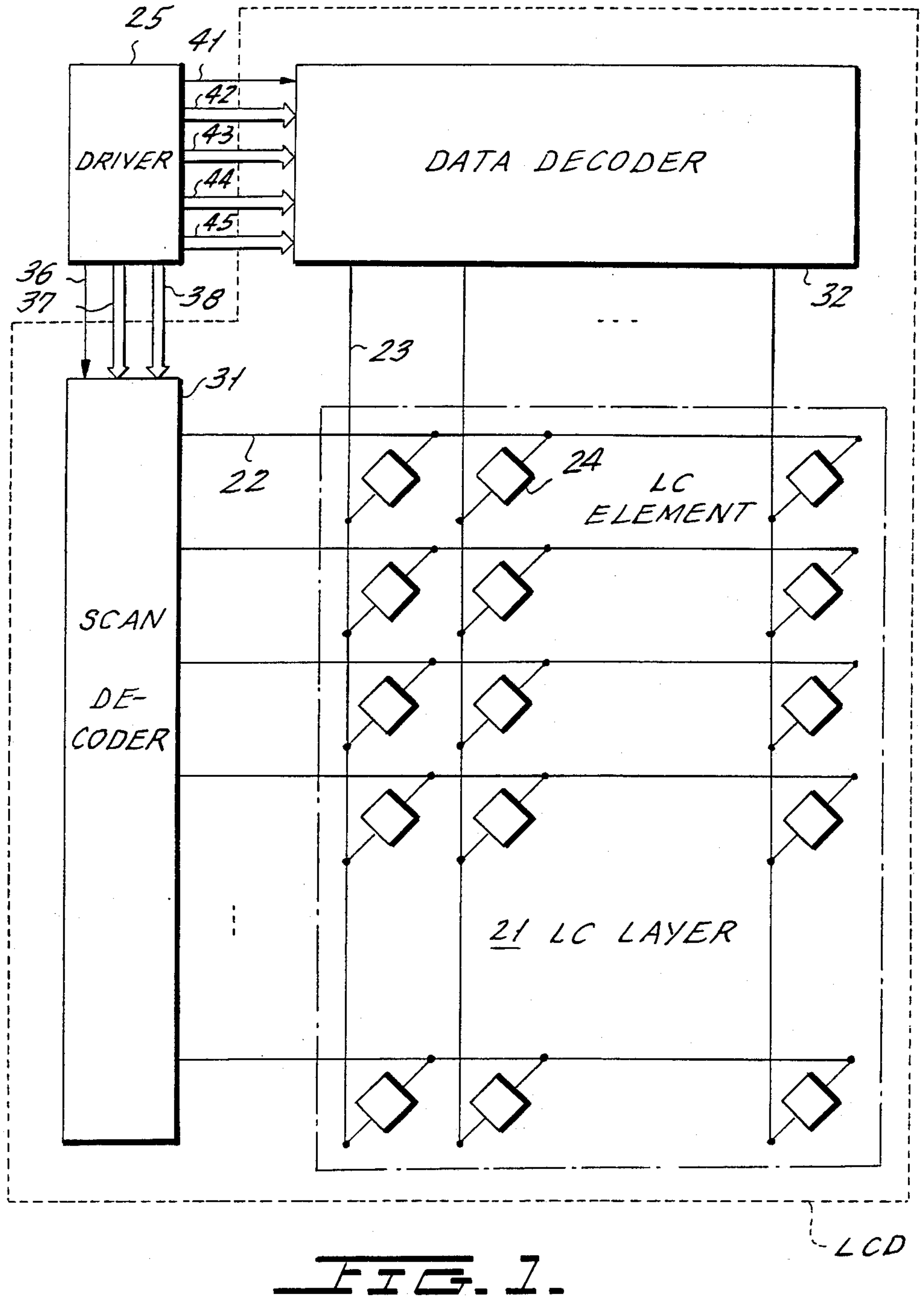
FIG. 1 is a block diagram of a matrix-type liquid crystal display device according to an embodiment of the instant invention.

Referring to FIG. 1, a matrix-type or dot-type liquid crystal display device comprises a layer 21 of a liquid crystal material. In a manner known in the art and as will be described below the liquid crystal layer 21 is interposed between a first and a second substrate, as of glass. The liquid crystal layer 21 has a first and a second principal surface directed to the first and the second substrates. It will be presumed merely for simplicity of description that the liquid crystal layer 21 is formed so as to be subjected to the twist nematic (TN) effect known in the art.

A plurality of scan or scanner electrodes 22 are arranged along rows of a matrix between the liquid crystal layer 21 and one of the substrates that may be the first substrate without loss of generally. A plurality of data electrodes 23 are arranged along columns of the matrix between the liquid crystal layer 21 and a selected one of the substrates. The rows need not be orthogonal to the columns. The scan and the data electrodes 22 and 23 are related to the liquid crystal layer 21 in a manner which will presently be described.

The scan and the data electrodes 22 and 23 define a great number of crossovers or dots. In cooperation with the liquid crystal layer 21, the crossovers prescribe picture elements of a pattern which may be letters and/or figures and should be visually displayed on the liquid crystal display device. A part of the liquid crystal layer 21 is therefore schematically depicted near each crossover as a liquid crystal element 24 which serves to visually display one of the picture elements when supplied with a voltage as will later be described.

In a manner which will become clear as the description proceeds, a driver 25 delivers an electric voltage to the scan electrodes 22 as a scan electrode voltage Vs in a predetermined order and another voltage to at least one of the data electrodes 23 as a data electrode voltage Vd. Typically, the scan electrode voltage is supplied to the scan electrodes 22 cyclically from the top row of the matrix to the bottom row. In this manner, the picture elements of each row are selected at a time collectively as a selected row, or more exactly, as picture elements of the selected row. The data electrode voltage is supplied to selected ones of the data electrodes 23 at a time according to the picture elements which should display either a continuous part or intermittent parts of the pattern along the selected row. Depending on the scan and the data electrode voltages, a voltage difference is alternately applied across each liquid crystal element 24 whereby the liquid crystal element 24 becomes either transparent or nontransparent as a result of the twist nematic effect.

Figure 2:
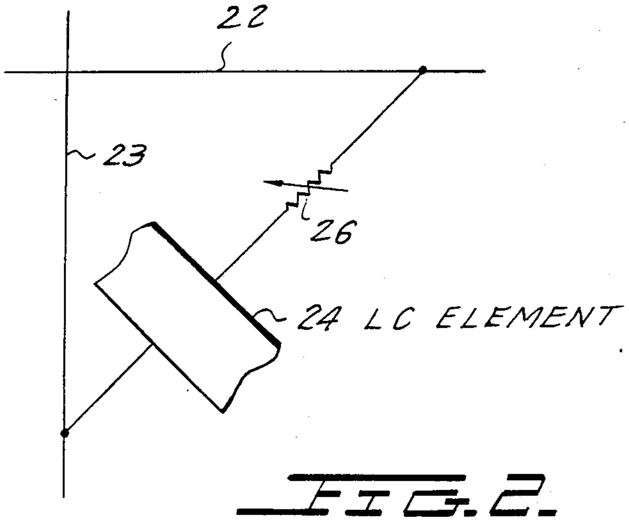
FIG. 2 is a schematic diagram of a portion of the liquid crystal display device illustrated in FIG. 1.

Turning to FIG. 2 for a short while, the liquid crystal element 24 is of a liquid crystal display device of an active matrix type. The scan electrodes 22 are arranged along the first principal surface with a nonlinear resistor 26 interposed between each liquid crystal element 24 and the scan electrode 22 which has the crossover at the liquid crystal element 24 in question. Such nonlinear resistors 26 are laminated in this manner between the scan electrodes 22 and the first principal surface at the respective crossovers. In the active matrix type being illustrated, the above-mentioned selected one of the substrates in the second substrate. The data electrodes 23 are therefore on the second principal surface. Each nonlinear resistor 26 is a metal-insulator-metal (MIM) element and is used as a switching element.

Figure 3:
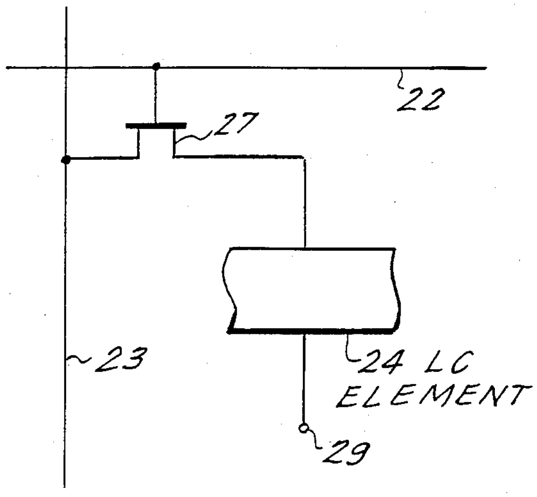
FIG. 3 is a schematic diagram of a like portion of the liquid crystal display device shown in FIG. 1.

Further turning to FIG. 3, the liquid crystal element 24 is of a liquid crystal display device of another active matrix type. The scan and the data electrodes 22 and 23 are arranged along the first principal surface alone. That is, the above-mentioned selected one of the substrates is the first substrate. The scan electrodes 22 are electrically insulated from the data electrodes 23. At the crossover of one of the scan electrodes 22 and one of the data electrodes 23, a thin-film transistor (TFT) 27 is formed for the liquid crystal element 24 with a drain electrode brought into contact with the first principal surface, a gate electrode connected to the foregoing one of the scan electrodes 22, and a source electrode connected to that one of the data electrodes 23. In this manner, such thin-film transistors 27 are laminated between the respective crossovers and the first principal surface. For the thin-film transistors 27, either amorphous silicon or polycrystalline silicon may be used as a semiconductor material. Like the nonlinear resistors 26 described in conjunction with FIG. 2, each thin-film transistor 27 serves as a switching element. A counterelectrode 29 is formed on the second principal surface and is usually grounded.

Reviewing FIGS. 2 and 3, it may be mentioned here that the liquid crystal layer 21 (FIG. 1) per se has a slow response to the voltage difference applied across each liquid crystal element 24. In other words, each liquid crystal element 24 does not quickly become transparent or nontransparent when the voltage difference is applied thereto or removed therefrom. In a liquid crystal display device of a simple matrix type wherein no switching element is used, the slow response gives rise to crosstalk between adjacent ones of the picture elements to reduce contrast between the transparent and the nontransparent liquid crystal elements. This furthermore makes it confusing to understand the pattern displayed on the liquid crystal display device particularly when the pattern is watched obliquely at a large angle. As a result, it has been impossible with a liquid crystal display device of the simple matrix type to increase the number of the scan and the data electrodes 22 and 23. On the contrary, the number may be as many as six hundred and forty for a liquid crystal display device of the active matrix type. When the liquid crystal display device is for an area of A4 of the ISO standards, the scan and the data electrodes 22 and 23 may be one thousand by one thousand in number.

Turning back to FIG. 1, the liquid crystal display device may be of the simple matrix type according to an aspect of the present invention. It is, however, preferred for a liquid crystal display device of a great number of picture elements that the liquid crystal display device should be either of the active matrix type illustrated with reference to FIG. 2 or of the active matrix type described with reference to FIG. 3. Attention will hereafter be mainly directed merely for brevity of description to the liquid crystal display device of the active matrix type described in connection with FIG. 2.

In FIG. 1, the liquid crystal display device has a structure according to a preferred embodiment of this invention. In a manner which will become clear as the description proceeds, a scan or scanner decoder 31 has a first number of input terminals connected to the driver 25 and a second number of output terminals connected to the respective scan electrodes 22. A data decoder 32 has a third number of input terminals connected to the driver 25 and a fourth number of output terminals connected to the respective data electrodes 23. For convenience of the description which follows, the input and the output terminals of the scan decoder 31 are herein called scan input and output terminals. The input and the output terminals of the data decoder 32 are termed data input and output terminals.

A scan or scanner source line 36, a small number of negative scan address lines 37, and an equal number of positive scan address lines 38 are extended from the driver 25 to the respective scan input terminals. At least one data source line 41, a small number of negative gate lines 42, a like number of positive gate lines 43, and at least one pair of negative and positive data lines 44 and 45 are extended from the driver 25 to the respective data input terminals. The gate lines 42 and 43 serve as data address lines. The scan address lines 37 and 38 will hereunder be referred to briefly as address lines. Those of the scan input terminals to which the negative and the positive address lines 37 and 38 are connected, will be called negative and positive scan terminals depending on the circumstances. The scan input terminal to which the scan source line 36 is connected, will be named a scan source terminal. The data input terminal to which the data source line 41 is connected, will be termed a data source terminal. Those of the data input terminals to which the negative and the positive gate lines 42 and 43 are connected, will be named negative and positive gate terminals. Those of the data input terminals to which the pair of negative and positive data lines 44 and 45 are connected, will be called a pair of negative and positive data terminals.

Each of the scan and the data decoders 31 and 32 is a thin-film decoder which comprises a plurality of thin-film active and passive circuit elements as will become clear in the following. In examples which will shortly be described, the active circuit elements are two-terminal circuit elements, namely, diodes. This simplifies manufacture of the scan and the data decoders 31 and 32. The active circuit elements may, however, be three-terminal circuit elements, namely, transistors. In any event, the decoder 31 or 32 may alternatively be referred to either as a code analyser or as a code selector.

The fact will presently become clear that each decoder 31 or 32 comprises a plurality of bipolar coincidene circuits or gates as herein called. The bipolar coincidence circuits of the scan decoder 31 will collectively be named a bipolar coincidence scan circuit. Those of the data decoder 32 will likewise be termed a bipolar coincidence data circuit. It may be pointed out in this connection that a unipolar coincidence circuit is well known in the art. At any rate, the coincidence circuit comprises two-terminal thin-film circuit elements which are typically diodes and resistors. It should be noted here that a liquid crystal display device is driven by an a.c. voltage in general. The unipolar coincidence circuit produces only a unipolar signal. In contrast, the bipolar coincidence circuit is novel and produces a bipolar signal.

The scan source line 36 is supplied from the driver 25 with a scan or scanner source voltage Ves which varies from a zero voltage 0 either to a negative or lower voltage Vn or to a positive or higher voltage Vp. The negative and the positive voltages ordinarily have a common absolute value. The zero voltage is used as a reference voltage which may alternatively be referred to which the word "scan" used as a modifier. The data source line 41 is supplied with a data source voltage Ved which is similar to the scan source voltage and will later be described in detail.

The driver 25 successively supplies the negative and the positive address lines 37 and 38 with address codes for the scan electrodes 22. Stated otherwise, the driver 25 delivers negative-logic and positive-logic scan voltages to pairs of the negative and the positive scan terminals. The negative-logic and the positive-logic voltages represent the address codes from time to time. It will become clear in the following that the scan decoder 31 decodes the address codes to deliver the scan source voltage Ves to the scan electrodes 22 as the scan electrode voltage Vs in the predetermined order.

Figure 4:
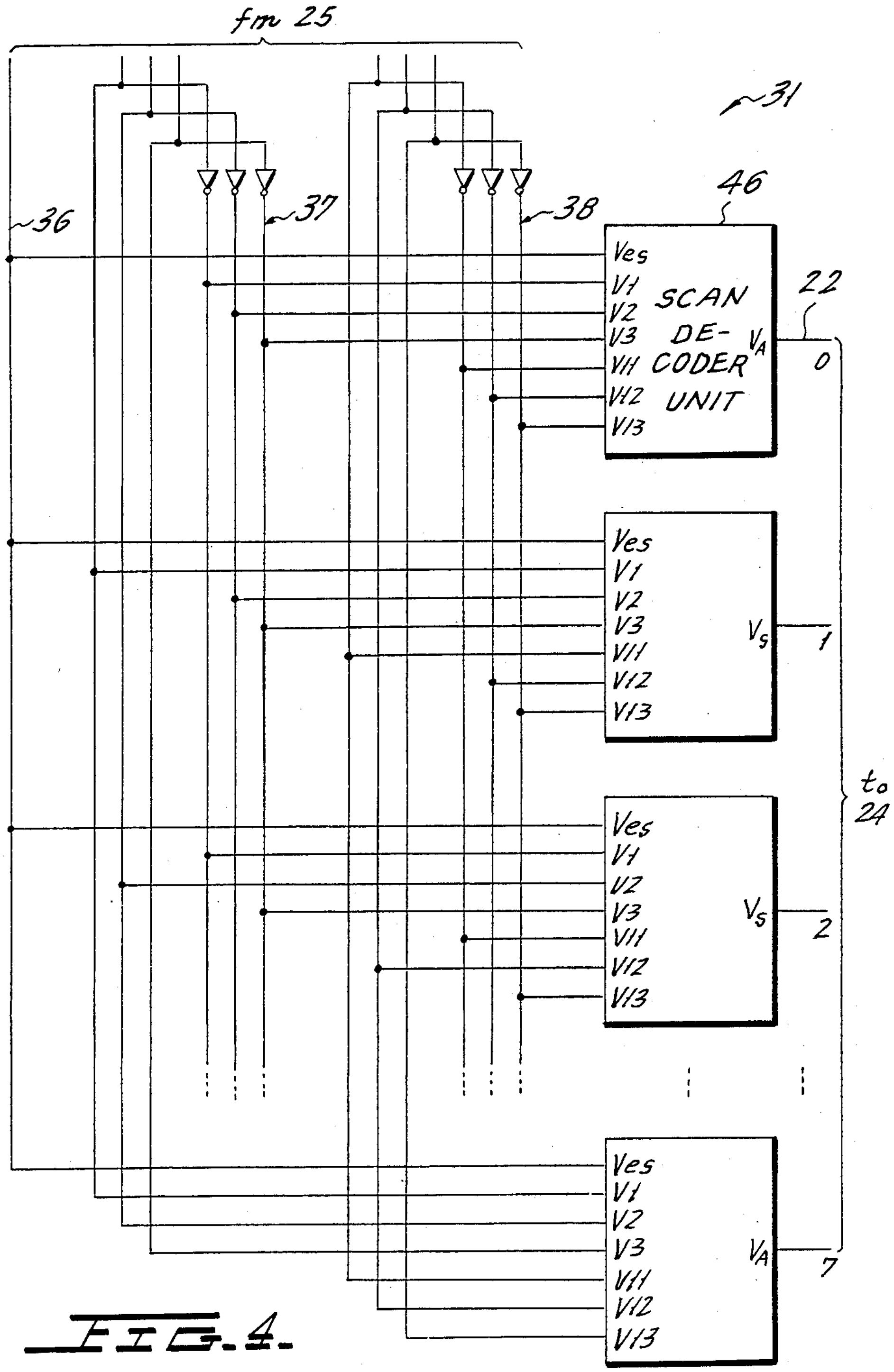
FIG. 4 is a block diagram of a scan decoder for use in the liquid crystal display device depicted in FIG. 1.

Referring to FIG. 4, the scan decoder 31 is for only eight scan electrodes which are again designated collectively or individually by the reference numeral 22 and are numbered 0, 1, 2, . . . , and 7 from the top row of the matrix to the bottom row. The scan decoder 31 is therefore a time division driving circuit of a one-to-eight dividing ratio and comprises zeroth through seventh scan decoder units which are collectively or individually indicated at 46 and are connected to the scan source line 36, the negative and the positive address lines 37 and 38, and the respective scan electrodes 0 through 7. Each scan decoder unit 46 is a bipolar coincidence circuit described above as will shortly become clear.

For the scan decoder 31 being illustrated, each address code is a three-bit bipolar binary code. More particularly, each address code has either first through third negative address bits A1, A2, and A3 for a negative logic or first through third positive address bits A11, A12, and A13 for a positive logic. In a manner which will presently be exemplified, each address bit of the negative logic has at a time one of a truth value and a false value. When the truth value is given by the zero voltage, the false value may be equal to the negative voltage Vn. When the truth value is given by the negative voltage Vn, the false value is equal to the zero voltage. Each address bit of the positive logic similarly has at a time one of a truth value and a false value. When the truth value is the zero voltage and the positive voltage Vp, the false value is equal to the positive voltage Vp and the zero voltage, respectively. Each address bit of the truth and the false values will be designated by addition of t and f to the reference symbol representative thereof.

In correspondence to the three negative address bits of the truth and the false values, the negative address lines 37 are six in number. The positive address lines 38 are also six in number. The address lines 37 and 38, twelve in total, are connected to the scan decoder units 46 selectively in the manner which is depicted and will later be described so that the scan electrode voltage Vs may be cyclically delivered to the scan electrodes 22.

Figure 5:
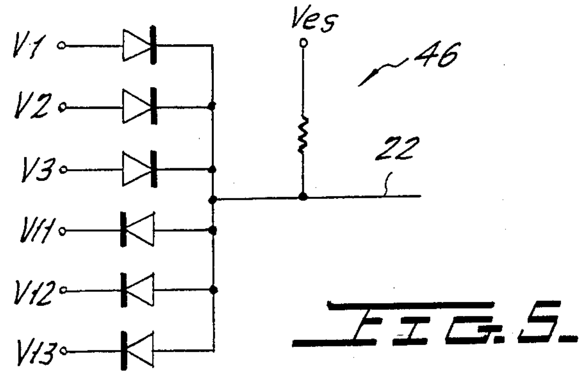
FIG. 5 is a circuit diagram of a scan decoder unit of the scan decoder illustrated in FIG. 4.

Turning to FIG. 5, each scan decoder unit 46 is connected to the scan source line 36 and one of the scan electrodes 22 and has three negative input leads V1, V2, and V3 and three positive input leads V11, V12, and V13. Each of the negative input leads is supplied with one of the zero voltage and the negative voltage Vn at a time. Each positive input lead is supplied with either the zero voltage or the positive voltage Vp. As a result, the scan decoder unit 46 has first through eighth states in correspondence to the one-to-eight dividing ratio.

The scan source line 36 is connected to the scan electrode 22 through a resistor and is supplied with the scan source voltage Ves. The negative and the positive input leads are connected to the scan electrode 22 through diodes which are poled so that the scan electrode voltage Vs may have one of the zero, the negative, and the positive voltages listed in Table 1 below for the first through the eighth states indicated by numerals 1 through 8.

TABLE 1

| State | 1 | 2 | 3 | 4 | 5 | 6 | 7 | 8 |
|---|---|---|---|---|---|---|---|---|
| Ves | Vn | Vn | Vn | Vn | Vp | Vp | Vp | Vp |
| V1 | 0 | Vn | Vn | Vn | 0 | 0 | 0 | 0 |
| V2 | 0 | 0 | Vn | Vn | 0 | 0 | 0 | 0 |
| V3 | 0 | 0 | 0 | Vn | 0 | 0 | 0 | 0 |
| V11 | 0 | 0 | 0 | 0 | 0 | Vp | Vp | Vp |
| V12 | 0 | 0 | 0 | 0 | 0 | 0 | Vp | Vp |
| V13 | 0 | 0 | 0 | 0 | 0 | 0 | 0 | Vp |
| Vs | 0 | 0 | 0 | Vn | 0 | 0 | 0 | Vp |

It will be understood from Table 1 that each scan decoder unit 46 can give the scan electrode voltage Vs the negative voltage Vn in the fourth state 4 alone and the positive voltage Vp only in the eighth state 8. In other states, the scan electrode voltage Vs is kept at the zero voltage. In this manner, the scan electrode voltage Vs is bipolar and can be varied from the zero voltage used as a scan reference voltage either to the negative voltage or to the positive voltage. Alternatively, the scan electrode voltage Vs can be varied from the zero voltage to the positive voltage Vp with the zero voltage used as a reference voltage and then from the positive voltage Vp to the zero voltage with the reference voltage switched from the zero voltage to the positive voltage Vp.

Turning back to FIG. 4, the negative and the positive address lines 37 and 38 are connected to the negative and the positive input leads V1 to V3 and V11 to V13 of the scan decoder units 46 in the manner exemplified in the figure. That is, these lines and leads are connected as listed in Table 2 hereunder.

TABLE 2

| Scan electrode No. | Negative input lead V1 | V2 | V3 | Positive input lead V11 | V12 | V13 |
|---|---|---|---|---|---|---|
| 0 | A1f | A2f | A3f | A11f | A12f | A13f |
| 1 | A1t | A2f | A3f | A11t | A12f | A13f |
| 2 | A1f | A2t | A3f | A11f | A12t | A13f |
| 3 | A1t | A2t | A3f | A11t | A12t | A13f |
| 4 | A1f | A2f | A3t | A11f | A12f | A13t |
| 5 | A1t | A2f | A3t | A11t | A12f | A13t |
| 6 | A1f | A2t | A3t | A11f | A12t | A13t |
| 7 | A1t | A2t | A3t | A11t | A12t | A13t |

When Tables 1 and 2 are compared, it will be understood at first that the negative and the positive values of the scan source voltage Ves should be equal to the peak values of the address codes A (suffixes omitted) and secondly that the scan decoder 31 is supplied with the scan source voltage Ves and decodes the address codes A into the scan electrode voltage Vs in the manner listed below in Table 3 for two consecutive frames which will be named first and second frames I and II. It is now appreciated that the negative voltage Vn is successively supplied to the scan electrodes 22 (0 through 7) in the first frame I. The positive voltage Vp is supplied in succession to the scan electrodes 22 in the second frame II. It is to be noted in this connection that the zero voltage is supplied in each frame to those of the scan electrodes 22 which are supplied with neither the negative voltage nor the positive voltage.

TABLE 3

| FRAME I: | | | | | | | | |
|---|---|---|---|---|---|---|---|---|
| Scan electrode No.: | 0 | 1 | 2 | 3 | 4 | 5 | 6 | 7 |
| Ves | Vn | Vn | Vn | Vn | Vn | Vn | Vn | Vn |
| Negative address bits: | | | | | | | | |
| A1t | 0 | Vn | 0 | Vn | 0 | Vn | 0 | Vn |
| A2t | 0 | 0 | Vn | Vn | 0 | 0 | Vn | Vn |
| A3t | 0 | 0 | 0 | 0 | Vn | Vn | Vn | Vn |
| A1f | Vn | 0 | Vn | 0 | Vn | 0 | Vn | 0 |
| A2f | Vn | Vn | 0 | 0 | Vn | Vn | 0 | 0 |
| A3f | Vn | Vn | Vn | Vn | 0 | 0 | 0 | 0 |
| Positive address bits A11t to A13t and A11f to A13f: | | | | | | | | |
| | 0 | 0 | 0 | 0 | 0 | 0 | 0 | 0 |
| Vs | Vn | Vn | Vn | Vn | Vn | Vn | Vn | Vn |
| FRAME II: | | | | | | | | |
| Scan electrode No.: | 0 | 1 | 2 | 3 | 4 | 5 | 6 | 7 |
| Ves | Vp | Vp | Vp | Vp | Vp | Vp | Vp | Vp |
| Negative address bits A1t to A3t and A1f to A3f: | | | | | | | | |
| | 0 | 0 | 0 | 0 | 0 | 0 | 0 | 0 |
| Positive address bits: | | | | | | | | |
| A11t | 0 | Vp | 0 | Vp | 0 | Vp | 0 | Vp |
| A12t | 0 | 0 | Vp | Vp | 0 | 0 | Vp | Vp |
| A13t | 0 | 0 | 0 | 0 | Vp | Vp | Vp | Vp |
| A11f | Vp | 0 | Vp | 0 | Vp | 0 | Vp | 0 |
| A12f | Vp | Vp | 0 | 0 | Vp | Vp | 0 | 0 |
| A13f | Vp | Vp | Vp | Vp | 0 | 0 | 0 | 0 |
| Vs | Vp | Vp | Vp | Vp | Vp | Vp | Vp | Vp |

Reviewing FIGS. 4 and 5, the scan decoder 31 comprises a combination of the resistors connected to the scan source line 36 and the diodes connected to the respective negative input leads, such as V1 to V3, as negative logic circuits of the respective scan decoder units 46 and another combination of the resistors connected to the scan source line 36 and the diodes connected to the respective positive input leads, such as V11 to V13, as positive logic circuits. The negative and the positive logic circuits are connected in pairs between the scan source line 36 and pairs of the negative and the positive address lines 37 and 38. The negative and positive logic circuit pairs are connected to the respective scan output terminals which are exemplified by the scan electrodes 22. When the scan source voltage Ves has the lower voltage Vn, the negative logic circuits supply a negative-going scan electrode voltage Vn to the scan output terminals in a prescribed order in response to the negative-logic and the positive-logic voltages. When the scan source voltage Ves has the higher voltage Vp, the positive logic circuits supply a positive-going scan electrode voltage Vp to the scan output terminals in the pescribed order in response to the negative-logic and the positive-logic voltages.

In FIG. 4, let the number of the scan electrodes 22 be S in general. Let the scan source line 36 and the negative and the positive address lines 37 and 38 be C in number. The numbers C and S are the first and the second numbers described earlier. The number of the negative and the positive address lines 37 and 38 is equal to $(C-1)$. The number S is related to the number C according to:

$$S \leqq 2^{(C-1)/4}.$$

Therefore, the number C is given by:

$$C \geqq 13.3 \times \log S + 1. \quad (1)$$

In other words, the first number C is much reduced when compared with the second number S. From Formula (1), it is possible to understand that the first number C is substantially logarithmically related to the second number S. Neglecting the unity added in Formula (1) to the logarithm, the first number C logarithmically varies with the second number S when the second number S is equal to a two's power, such as 128, 256, 512, or 1024. Examples of the first number C will later be listed for various values of the second number S as counted by Formula (1).

Figure 6:
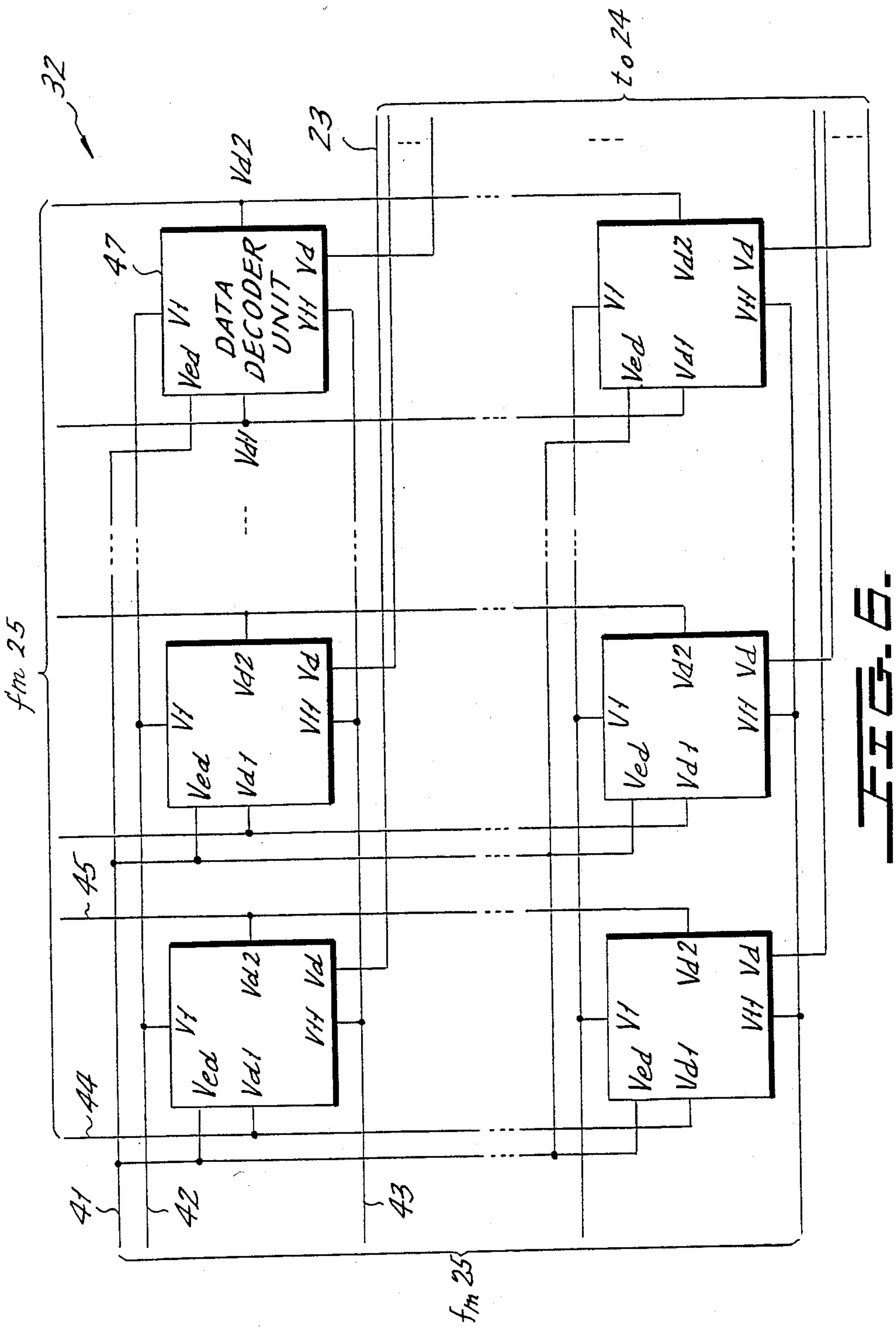
FIG. 6 is a block diagram of a data decoder for use in the liquid crystal display device shown in FIG. 1.

Referring to FIG. 6, the data decoder 32 is of a matrix address or drive type and is for the data electrodes 23, D in number in general. The D data electrodes 23 are again designated collectively or individually by the reference numeral 23. Like the scan decoder 31 (FIGS. 1 and 4), the data decoder 32 comprises a plurality of data decoder units which are collectively or individually indicated at 47. Each data decoder unit 47 is a bipolar coincidence circuit of the type described before.

When the matrix address type is resorted to, the data decoder units 47 are connected to the data source line 41 and the respective data electrodes 23 and driven by pairs of the negative and the positive gas lines 42 and 43 and pairs of the negative and the positive data lines 44 and 45 matrically, namely, in a matrix fashion. More specifically, the data decoder units 47 are classified into a predetermined number J of groups which may correspond to rows of a matrix. Each group consists of a predetermined integer K of data decoder units which may correspond to first through K-th columns of the matrix under consideration. When the number D of all data electrodes 23 is not an integral multiple of the predetermined number J, at least one of the groups should consist of data decoder units, less in number than the predetermined integer K. The data decoder units 47 of each group are connected to one of the pairs of negative and positive gate lines 42 and 43. The data decoder units 47 of each "column" are connected to one of the pairs of negative and positive data lines 44 and 45. The data source line 41, the negative and the positive gate lines 42 and 43, and the negative and the positive data lines 44 and 45 are therefore equal to (1+2L+2K) in number, which number is called the third number hereinabove and will be represented by A. The above-mentioned number D is the fourth number.

For a data decoder 32 of the matrix address type, it will readily be understood that the third number A becomes minimum when the fourth number D has a square root M which is an integer. The fourth number D, however, has not ordinarily such a square root. In this instance, an integer M' will be selected so as to be not greater than the square root M and be nearest to the square root M. When the integer M' is used either as the predetermined number J or as the predetermined integer K, a minimum is achieved for the third number A.

Figure 7:
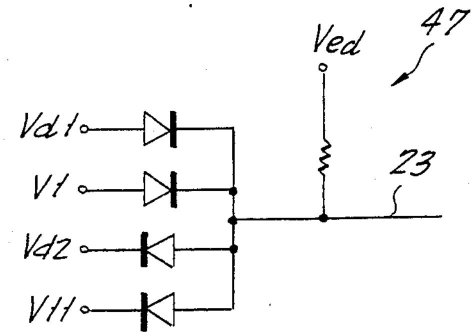
FIG. 7 is a circuit diagram of a data decoder unit of the data decoder illustrated in FIG. 6.

Turning to FIG. 7, each of the data decoder units 47 is supplied with the data source voltage Ves through the data source line 41, a one-bit negative binary code through one of the negative gate lines 42, a one-bit positive binary code through one of the positive gate lines 43, a first datum Vd1 through one of the negative data lines 44, and a sedond datum Vd2 through one of the positive data lines 45. One of the negative gate lines 42 and one of the positive data lines 43 that are used for each data decoder unit 47, will be called negative and positive input leads and indicated at V1 and V11 like for the scan decoder unit 46 (FIGS. 4 and 5). The data decoder unit 47 has first through eighth states.

In each data decoder unit 47, the data source line 41 is connected to the data electrode 23 through a resistor. The negative and the positive input leads V1 and V11 and the negative and the positive data lines 44 and 45 are connected to the data electrode 23 through diodes which are poled so that the data electrode 23 may be supplied with either a negative voltage En or a positive voltage Ep in the manner listed hereunder in Table 4 for the first through the eighth states indicated by numerals 1 through 8. The neative and the positive voltages En and Ep ordinarily have a common absolute value. Although named the negative and the positive binary codes, each one-bit binary code is variable between the negative and the positive voltages En and Ep

TABLE 4

| State | 1 | 2 | 3 | 4 | 5 | 6 | 7 | 8 |
|---|---|---|---|---|---|---|---|---|
| Ved | Ep | Ep | Ep | Ep | En | En | En | En |
| Vd1 | En | En | En | En | Ep | En | Ep | En |
| V1 | En | En | En | En | Ep | Ep | En | En |
| Vd2 | En | Ep | En | Ep | Ep | Ep | Ep | Ep |
| V11 | En | En | Ep | Ep | Ep | Ep | Ep | Ep |
| Vd | En | En | En | Ep | Ep | Ep | Ep | En |

Comparison of Tables 1 and 4 will show that the data source voltage Ved should have the positive voltage Ep when the scan source voltage Ves is kept at the negative voltage Vn. The data source voltage Ved shold have the negative voltage En while the scan source voltage Ves has the positive voltage Vp. One of the liquid crystal elements 24 (FIG. 1) is selected when the voltages V and E (suffixes omitted) of a difference polarity are supplied to the scan and the data electrodes 22 and 23 which have the crossover at the liquid crystal element 24 in question.

Figure 8:
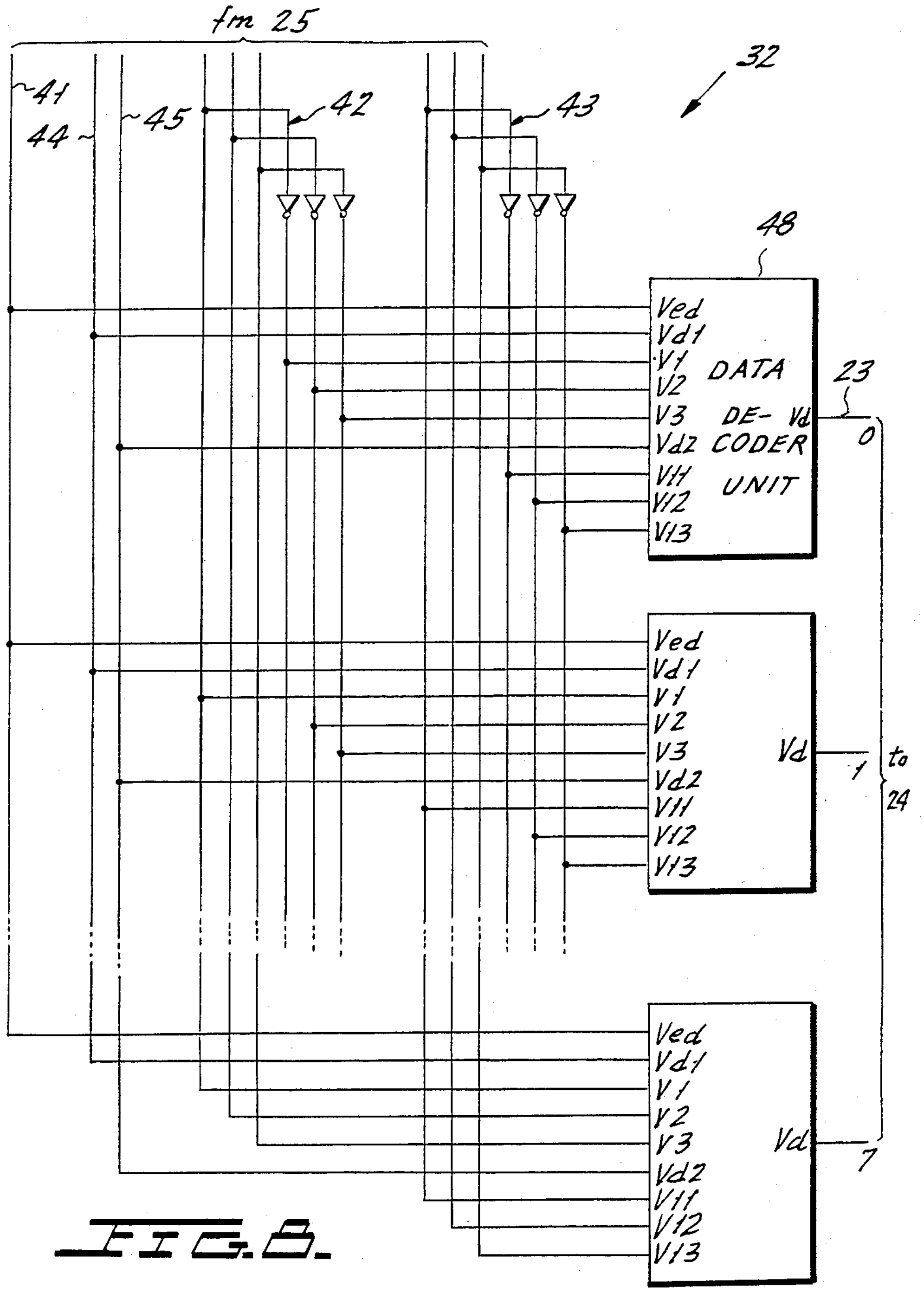
FIG. 8 is a block diagram of a data decoder for use in the liquid crystal display device depicted in FIG. 1 in place of the data decoder depicted in FIG. 6.
Figure 10:
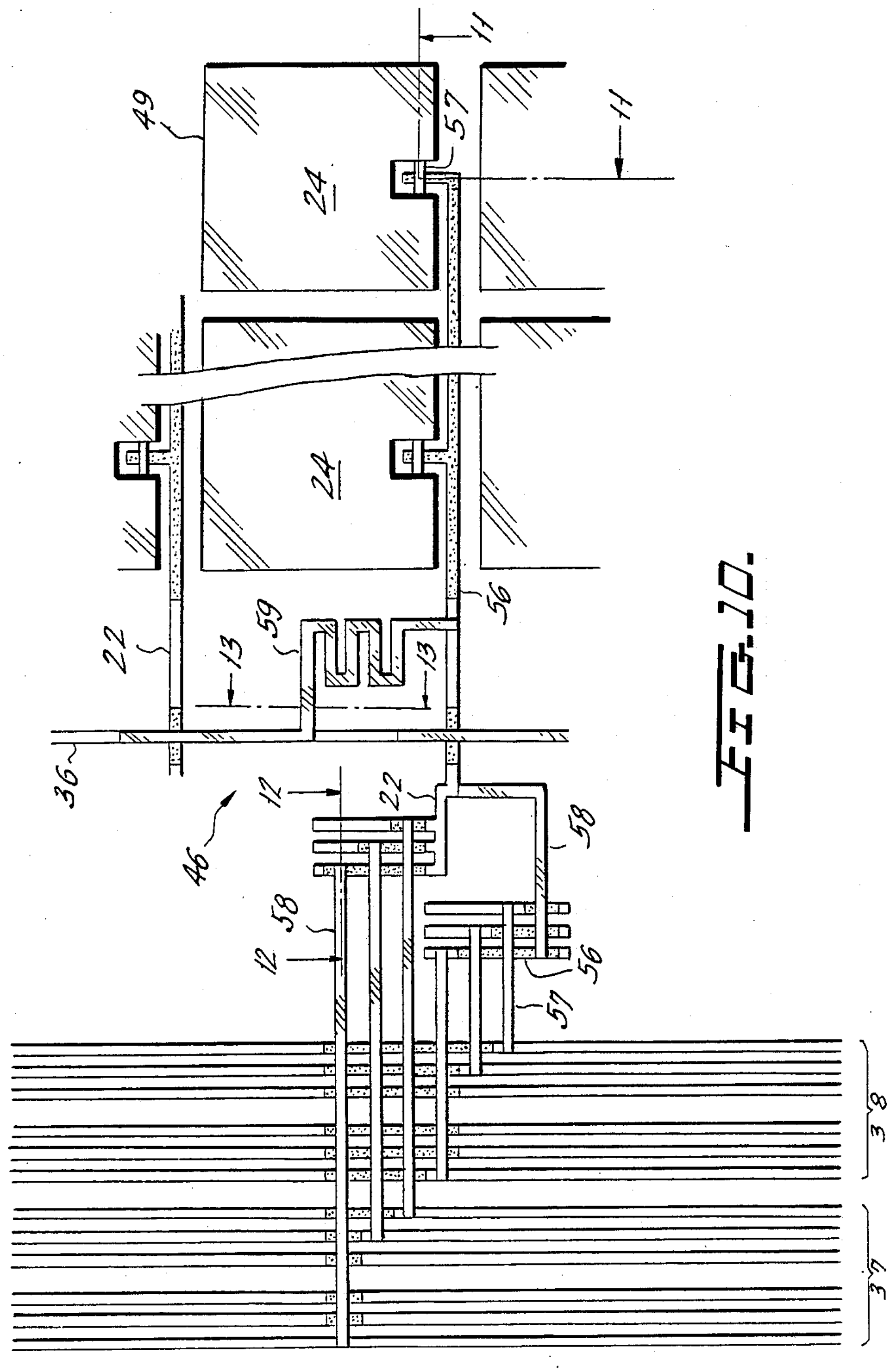
FIG. 10 schematically shows, partly on an enlarged scale, a matrix-type liquid crystal display device according a first example of this invention.

Referring to FIG. 8, the data decoder 32 is of an encoded address type and is for a group of eight data electrodes which are designated again by the reference numeral 23. The data decoder 32 comprises eight data decoder units which are connected to the respective data electrodes 23 of the group and are collectively or individually indicated at 48. Each data decoder unit 48 is again a bipolar coincidence circuit.

In contrast to the data decoder units 47 of each "group" described in conjunction with FIGS. 6 and 7 for the matrix address type, the data decoder units 48 are connected to the data source line 41, selected ones of the negative and the positive gate lines 42 and 43, and only one pair of the negative and the positive data lines 44 and 45. In cooperation with the first and the second data Vd1 and Vd2, three-bit bipolar binary codes are used in addressing at least one of the data decoder units 48 at a time. In other words, the codes are used in gating the data Vd1 and Vd2 to at least one of the data electrodes 23.

A total number of the data source line or lines 41, the gate lines 42 and 43, and the data lines 44 and 45 will be referred to again as the third number. A different letter B will, however, be used to represent this third number for convenience of the description which follows. The third number B becomes minimum when all data electrodes 23 are individually addressed without grouping the data electrodes 23 into a plurality of groups. In this event, only one pair of the negative and the positive data lines 44 and 45 is used in the data decoder 32. Alternatively, the data electrodes 23 and consequently the data decoder units 48 may be grouped into a certain number of groups, each consisting of a plurality of data electrodes or of the data decoder units, K in number. The number K will be said to represent a degree of multiplexing of each data line 44 or 45. Although the letter K for the above-described predetermined integer is used to represent the degree of multiplexing, it should be noted that only a pair of data lines 44 and 45 is used for the K data electrodes of each group according to the encoded address type in contrast to K pairs of the data lines 44 and 45 used for the K data electrodes of each group according to the matrix address type. The number B is therefore considerably less than the number A described earlier. When the data electrodes 23 are thus grouped, consecutive ones of the data electrodes 23 may be grouped into different groups rather than into one of the groups.

The encoded address type, however, results in a high degree of multiplexing when the fourth number D is great and moreover when the data electrodes 23 are grouped into a small number of groups. When the switching elements of the active matrix type have a low switching capability, the high degree of multiplexing might result in a poor contrast between the picture elements and in crosstalk between adjacent picture elements. The degree of multiplexing must therefore be decided in consideration of such results. For the data decoder 32 being illustrated, the degree of multiplexing is eight, namely, two to the power three. The negative gate lines 42 are therefore three in number. The positive gate lines 43 are also three in number.

Figure 9:
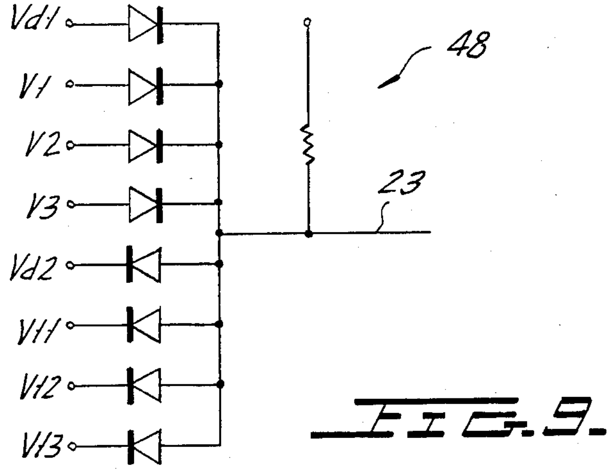
FIG. 9 is a circuit diagram of a data decoder unit of the data decoder illustrated in FIG. 8.

Turning to FIG. 9, the data decoder unit 48 is similar in structure to the data decoder unit 47 illustrated with reference to FIG. 7. The data decoder unit 48 has three negative input leads V1, V2, and V3 and three positive input leads V11, V12, and V13 and is supplied with the data source voltage Ved through the data source line 41 and with the first and the second data Vd1 and Vd2 through the respective data lines 44 and 45. The input leads V1 to V3 and V11 to V13 of the data decoder unit 48 are selectively connected to the three negative gate lines 42 for each of the truth and the false values and the three positive gate lines 43 for each of the truth and the false values in the manner listed before in Table 3 for the scan decoder unit 46 (FIGS. 4 and 5) by using the address codes A supplied to the negative and the positive address lines 37 and 38.

In the data decoder unit 48 being illustrated, diodes are poled so that the data decoder unit 48 is operable in first through tenth states 1 to 10 as listed in Table 5 hereunder. The negative and the positive voltages Vn and Vp are used for the data source voltage Ved, the first and the second data Vd1 and Vd2, and each bit of the address codes A.

TABLE 5

| State | 1 | 2 | 3 | 4 | 5 | 6 | 7 | 8 | 9 | 10 |
|---|---|---|---|---|---|---|---|---|---|---|
| Ved | Vp | Vp | Vp | Vp | Vp | Vn | Vn | Vn | Vn | Vn |
| Vd1 | Vn | Vn | Vn | Vn | Vn | Vn | Vn | Vn | Vn | Vp |
| V1 | Vn | Vn | Vn | Vn | Vn | Vp | Vn | Vn | Vn | Vn |
| V2 | Vn | Vn | Vn | Vn | Vn | Vp | Vp | Vn | Vn | Vn |
| V3 | Vn | Vn | Vn | Vn | Vn | Vp | Vp | Vp | Vn | Vn |
| Vd2 | Vn | Vp | Vp | Vp | Vn | Vp | Vp | Vp | Vp | Vp |
| V11 | Vn | Vp | Vp | Vp | Vp | Vp | Vp | Vp | Vp | Vp |

TABLE 5-continued

| State | 1 | 2 | 3 | 4 | 5 | 6 | 7 | 8 | 9 | 10 |
|---|---|---|---|---|---|---|---|---|---|---|
| V12 | Vn | Vn | Vp | Vp | Vp | Vp | Vp | Vp | Vp | Vp |
| V13 | Vn | Vn | Vn | Vp | Vp | Vp | Vp | Vp | Vp | Vp |
| Vd | Vn | Vn | Vn | Vp | Vn | Vp | Vp | Vp | Vn | Vp |

Reviewing FIG. 6, the third number A is related to the fourth number D for the matrix address type by:

$$D \geqq [(A-1)/4]^2,$$

namely, by:

$$A \leqq 4 \times \sqrt{D} + 1. \quad (2)$$

The third number A is therefore substantially equal to four times a square root of the fourth number D.

Reviewing FIG. 8, the third number B is related to the fourth number D for the encoded address type like Formula (1) derived for the first and the second numbers C and S. When the data electrodes 23 are not classified into a plurality of groups, the third number B will be denoted by B1. When the data electrodes 23 are grouped into two groups and four groups, the third number will be denoted by B2 and B3. Such numbers are related to the fourth number D in accordance with:

$$B1 \leqq 13.3 \times \log D + 3, \quad (3)$$

$$B2 \leqq 2[13.3 \times \log (D/2)] + 6, \quad (4)$$

and $$B3 \leqq 4[13.3 \times \log (D/4)] + 12. \quad (5)$$

The number C for the scan decoder 31 and the numbers A and B1 through B3 for the data decoder 32 are listed below in Table 6 for various values of the number S of the scan electrodes 22 or the number D of the data electrodes 23 as counted according to Formulae (1) through (5). When the number S or D of the electrodes 22 or 23 is as many as several hundreds, the number C or B1 is less than one tenth of the number S or D. The numbers A and B2 are one digit less than the number S or D. The number B3 is likewise less than S or D. When the number S or D is one thousand or more, the number C, B1, or B2 is two digits less than the number S or D. The numbers A and B3 are one digit less than the number S or D.

TABLE 6

| S or D | C | A | B1 | B2 | B3 |
|---|---|---|---|---|---|
| 50 | 24 | 30 | 26 | 44 | 71 |
| 100 | 28 | 41 | 30 | 52 | 86 |
| 400 | 36 | 81 | 38 | 68 | 119 |
| 500 | 37 | 90 | 39 | 70 | 124 |
| 640 | 39 | 103 | 41 | 73 | 130 |
| 1000 | 41 | 128 | 43 | 78 | 140 |
| 2000 | 45 | 180 | 47 | 86 | 156 |
| 5000 | 51 | 284 | 53 | 97 | 177 |

It may be mentioned here in connection with Table 6 that the liquid crystal display layer 21 may have a pair of longer sides and a pair of shorter sides. In this event, the scan electrodes 22 should be preferably those arranged parallel to the shorter sides. Incidentally, attention will be directed to the example that is very briefly described in the Malmberg et al report referred to hereinabove. It may be assumed that a liquid crystal display device comprises 1,042 scan electrodes and 1,042 data electrodes and that the data electrodes are driven by a data decoder of the matrix address type described heretobefore with reference to FIGS. 6 and 7. In this instance, the scan decoder has 45 input terminals. The data decoder has 133 input terminals. The driver outputs are therefore reduced from 232 to 178 according to the present invention.

Reviewing FIGS. 6 and 7, it is possible to understand that each group of the data decoder units 47 is depicted vertically of the figure. In this case, the first through the K-th or less data decoder units 47 are depicted horizontally of the figure. The number D of the data electrodes 23 should not be less than a product LK of the predetermined number and the predetermined integer and should be greater than another product (L−1)K of the predetermined number less one and the predetermined integer or still another product L(K−1) of the predetermined integer less one and the predetermined number. The data input terminals consist of a source terminal for connection to the data source line 41, first through B-th pairs of address terminals for connection to the gate lines 42 and 43, and first through K-th pairs of data terminals for connection to the data lines 44 and 45. The first through the L-th data decoder units 47 are connected to the source terminal and to the first through the L-th pairs of gate terminals, respectively. The first through the K-th data decoder units 47 are connected to the source terminal and to the first through the K-th pairs of data terminals, respectively.

Reviewing FIG. 1 together with FIGS. 4, 6, and 8, it will be presumed that each scan electrode 22 be supplied with either of the negative and the positive voltages Vn and Vp as an address signal during an element time interval Te. In the example listed above in Table 3, each frame I or II has a frame period Tf which is equal to eight element time intervals. During the element time interval in which the address signal is applied to the liquid crystal elements 24 of one of the rows of the matrix that is heretobefore referred to briefly as the selected row, either of the negative and the positive voltages En and Ep or Vn and Vp is supplied as a gating signal to at least one of the liquid crystal elements 24 of the selected row. At the same time, either of the negative and the positive voltages En and Ep or Vn and Vp is applied as a data signal to the at least one liquid crystal element 24 of the selected row with a polarity which is opposite to that of the address signal. In this manner, an a.c. voltage is supplied across those of the liquid crystal elements 24 of the liquid crystal display device which are selected as selected elements in compliance with the pattern to be visually displayed. The a.c. voltage has a waveform which is substantially identical with that achieved by the voltage averaging scheme known in the art.

Referring back to FIGS. 5 through 9, it may be desirable depending on the circumstances to use a unipolar negative or positive voltage in carrying out the phase difference drive as known in the art. In this event, first through sixth voltages W1 to W6 can be selectively used as each of the address data and the gate signal. Tables 7 and 8 are shown in the following for use in place of Tables 1 and 4. The voltages should be successively higher except that the third voltage W3 may be equal to the fourth voltage W4. Ordinarily, the first and the second voltages W1 and W2 have a difference which is equal to each of those between the second and the third voltages W2 and W3, between the fourth and the fifth voltages W4 and W5, and between the fifth and the sixth voltages W5 and W6. Such a difference is equal to 1/B times the difference between the first and the sixth voltages W1 and W6, where B represents the number of driving biases and is not less than four, such as a number between four and ten,

TABLE 7

| State | 1 | 2 | 3 | 4 | 5 | 6 | 7 | 8 |
|---|---|---|---|---|---|---|---|---|
| Ves | W1 | W1 | W1 | W1 | W6 | W6 | W6 | W6 |
| V1 | W5 | W1 | W1 | W1 | W2 | W2 | W2 | W2 |
| V2 | W5 | W5 | W1 | W1 | W2 | W2 | W2 | W2 |
| V3 | W5 | W5 | W5 | W1 | W2 | W2 | W2 | W2 |
| V11 | W5 | W5 | W5 | W5 | W2 | W6 | W6 | W6 |
| V12 | W5 | W5 | W5 | W5 | W2 | W2 | W6 | W6 |
| V13 | W5 | W5 | W5 | W5 | W2 | W2 | W2 | W6 |
| Vs | W5 | W5 | W5 | W1 | W2 | W2 | W2 | W6 |

TABLE 8

| State | 1 | 2 | 3 | 4 | 5 | 6 | 7 | 8 |
|---|---|---|---|---|---|---|---|---|
| Ved | W6 | W6 | W6 | W6 | W1 | W1 | W1 | W1 |
| Vd1 | W4 | W4 | W4 | W4 | W3 | W1 | W3 | W1 |
| Vd1 | W4 | W4 | W4 | W4 | W3 | W1 | W3 | W1 |
| Vd2 | W4 | W6 | W4 | W6 | W3 | W3 | W3 | W3 |
| V11 | W4 | W4 | W6 | W6 | W3 | W3 | W3 | W3 |
| Vd | W4 | W4 | W4 | W6 | W3 | W3 | W3 | W1 |

Referring now to FIGS. 10 through 13, a first example of the liquid crystal display device is of the matrix type and comprises the liquid crystal layer 21, the scan electrodes 22, and the data electrodes 23 on the first and the second principal surfaces of the liquid crystal layer 21. Such liquid crystal display devices were actually manufactured for various tests according to this invention.

Figure 11:
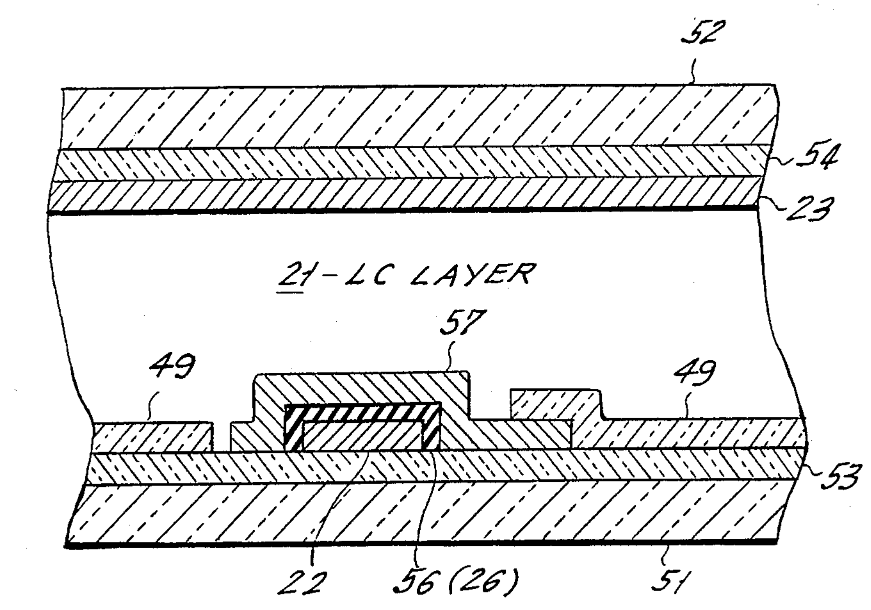
FIG. 11 schematically shows a section taken on line 11—11 drawn in FIG. 10.

In a manner which will presently be described, a linear succession of element electrodes 49 was used to define in cooperation with each scan electrode 22 one of the rows of the liquid crystal elements 24 described in conjunction with FIG. 1. One of the liquid crystal elements 24 is depicted in FIG. 11 on the right-hand side of the figure. Only a part of another liquid crystal element is shown on the left-hand side of the figure.

The liquid crystal display device comprises first and second glass substrates 51 and 52 to which the first and the second principal surfaces of the liquid crystal layer 21 are directed. First and second protective or passivation layers 53 and 54 were formed on the first and the second substrates 51 and 52. The protective layers 53 and 54 may be formed of silicon dioxide ($SiO_2$) or tantalum oxide ($Ta_2O_5$) and are for preventing sodium ions or like foreign substances from migrating from the glass substrates 51 and 52 into the liquid crystal layer 21. Although the protective layers 53 and 54 may be dispensed with, it will be assumed throughout the following for brevity of description that the liquid crystal display device includes the protective layers 53 and 54.

The liquid crystal layer 21 has a substantially rectangular outline having four sides. The scan decoder 31 is placed between the first and the second substrates 51 and 52 on the first substrate along one of the four sides outwardly of the liquid crystal layer 21. The data decoder 32 is placed also between the first and the second substrates 51 and 52. The data decoder 32 is, however, positioned on the second substrate 52 in an offset positional relation to the liquid crystal layer 21 and the scan decoder 31. More particularly, the data decoder 32 is situated outwardly of the liquid crystal layer 21 along a different side.

After formation of the protective layer 53 on the first substrate 51, tantalum was d.c. sputtered onto the protective layer 53 in an argon atmosphere in the known manner to form a tantalum layer to a thickness of 0.4 micron (4000 Å). By using the ordinary dry etching technique with the photolithographic process in a manner known in the art, the tantalum layer was selectively etched into four hundred scan electrodes 22 at a center-to-center distance of 0.30 mm, the scan source line 36, and the negative and the positive address lines 37 and 38 described in connection with FIG. 1.

The address lines 37 and 38 were thirty-six in number for nine-bit bipolar codes of the type described in conjunction with FIGS. 4 and 5. It is to be noted here in connection with an example illustrated with reference to FIGS. 4 and 5 and listed in Tables 1 and 2 that the diodes of the scan decoder units 46 are selectively poled. For use in forming the diodes, eighteen short stripes were left between each scan electrode 22 and the address lines 37 and 38 on resorting to the dry etching technique. In the example being illustrated, nine inner ones of the short stripes were on one side of the scan electrode 22 in electrical contact with the scan electrode 22 under consideration. Nine outer ones of the short stripes were on the other side of the scan electrode 22 and were electrically isolated therefrom.

Figure 12:
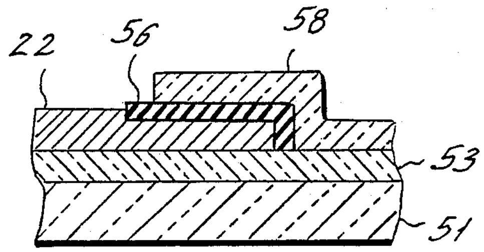
FIG. 12 schematically shows another section taken on line 12—12 depicted in FIG. 10.
Figure 13:
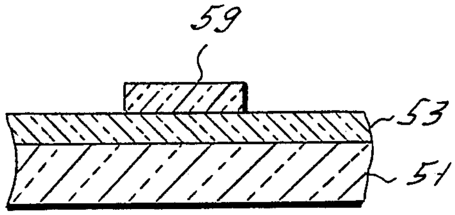
FIG. 13 schematically shows still another section taken on line 13—13 shown in FIG. 10.

By selectively removing portions of a resist (not shown), exposed portions were formed along the scan electrodes 22, on predetermined parts of the short stripes, and on a selected area which spreads along each of the scan address lines 37 and 38. The exposed portions were subjected to anode oxidation with an aqueous solution of citric acid of 0.1 percent by weight. For this purpose, the outer short stripes were connected to the scan electrode 22 temporarily during the anode oxidation. Insulator layers 56 were thereby formed to a thickness of 0.06 micron. In FIG. 11, the insulator layer 56 serves as a nonlinear resistor which is indicated earlier in FIG. 2 at 26. In FIG. 12, the insulator layer 56 is used as a part of a diode which is depicted in FIG. 5. The insulator layers on the selected areas are for the purpose which will very soon be described.

Chromium was evaporated in vacuum to form chromium layers selectively on the insulator layers 56. Each chromium layer serves as a connection electrode 57 on each insulator layer 56 formed on a side extension of the scan electrode 22. In consideration of the example described with reference to FIGS. 4 and 5 and listed in Tables 1 and 2, nine of the chromium layers are used for each scan electrode 22 in connecting the nine outer ones of the short stripes selectively to the negative and the positive address lines 37 and 38 over the insulator layers formed on the short stripes and on the selected area.

Anode layers 58, thin-film resistors 59, and the element electrodes 49 were formed with indium oxide-tin oxide (ITO) by using either of the magnetron sputtering technique and the reactive ion plating technique, both known in the art, and by resorting to the photolithographic process. In electrical contact with each scan electrode 22, the anode layer 58 was formed on the insulator layer which is formed on the outer ones of the short stripes and is used as parts of the diodes. Like the chromium layer used between the inner short stripes and the address lines 37 and 38, nine of the anode layers 58 are used for each scan electrode 22 in connecting the nine inner ones of the short stripes selectively to the negative and the positive address lines 37 and 38 over the insulator layers formed on the inner short stripes and on the selected area.

After formation of the protective layer 54 on the second substrate 52, the data source line 41, the negative and the positive gate lines 42 and 43, and the negative and the positive data lines 44 and 45 were formed like the scan electrodes 22, the scan source line 36, and the address lines 37 and 38. Short stripes were also formed for the diodes of the data decoder units 47 of the data decoder 32 illustrated with reference to FIGS. 6 and 7. The gate and the data lines 42 through 45 were eighty in total.

Anode layers and the data electrodes 23 were formed like the anode layers 58 and the element electrodes 49. In contrast to the element electrodes 49, the data electrodes 23 were formed in stripes as in the liquid crystal display devices of the simple matrix type. The data electrodes 23 were four hundred in number and had a center-to-center distance of 0.30 mm.

In a manner known in manufacture of twist nematic liquid crystal displays, a twist nematic liquid crystal material was introduced into a space which was formed by keeping the first and the second substrates 51 and 52 parallel. The liquid crystal material was ZLI-1565 manufactured and sold by the world-famous known E. Merck, NPF-1100H manufactured and sold by Nitto Electric Industrial Company, Oosaka-hu Ibaraki-si, Japan, was used as each optical polarizing layer.

The diodes of the scan and the data decoders 31 and 32 were formed as above. The current flows from the anode layer 58 to the tantalum layer which may be the short stripes connected to the scan and the data electrodes 22 and 23 or selectively to the address lines 37 and 38 or to the gate and the data lines 42 through 45. The diodes had as high a current ratio as $10^4$ for $\pm 10$ volts. The resistance of the thin-film resistor 59 was adjusted by the cross-sectional area depicted in FIG. 13 and by the pattern depicted in FIG. 10.

The liquid crystal display device thus manufactured, was driven according to the voltages exemplified in Tables 7 and 8 and by using five as the number B of biases. It was possible to get a contrast ratio of 5:1. The viewing field had an angle of $\pm 50°$.

Figure 14:
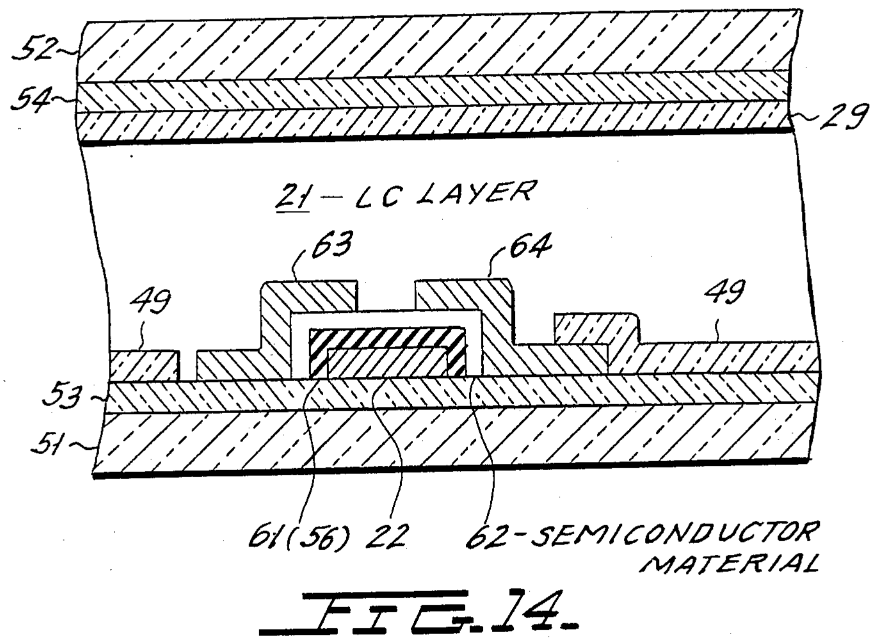
FIG. 14 schematically shows, partly on an enlarged scale, a section of a matrix-type liquid crystal display device according to a second example of this invention.

Finally referring to FIG. 14, a second example of the liquid crystal display device is of the active matrix type illustrated with reference to FIG. 3. The liquid crystal display device therefore comprises the scan and the data electrodes 22 and 23, all along the first principal surface of the liquid crystal layer 21. The scan and the data decoders 31 and 32 were formed on the first protective layer 53 along one and another of the four sides mentioned before.

After formation of the protective layer 53 on the first substrate 51, tantalum was sputtered and treated as above into the scan electrode 22, the scan source line 36, the address lines 37 and 38, the data source line 41, the gate lines 42 and 43, the data lines 44 and 45, and the short stripes. The tantalum of the scan electrodes 22, the address, the gate, and the data lines 37, 38, and 42 through 45, and the short stripes was selectively oxidized to provide the insulator layers 56 to a thinner thickness of 0.05 micron on the lines 37, 38, and 42 through 45 and on the short stripes and to a thicker thickness of 0.2 micron on the scan electrodes 22. On the scan electrodes 22, each insulator layer 56 serves as a gate insulator 61 of the thin-film transistor 27 described in connection with FIG. 3.

An amorphous silicon layer 62 was formed on each gate insulator 61 in a manner known in manufacture of thin-film transistors. Chromium was selectively evaporated as above to provide the data electrodes 23 across the scan electrodes 22. At the same time, a side extension 63 and a connection electrode 64 were formed for each liquid crystal element 24 described in conjunction with FIGS. 1, 3, and 10. Such side extensions 63 were for each data electrode 23 and were formed as projections thereof.

Indium oxide-tin oxide layers were formed to provide the anode layers 58 for the respective diodes and the element electrodes 49 for the respective liquid crystal elements 24. Each element electrode 49 is in contact with the connection electrode 64 and out of direct contact with the data electrode 23.

After formation of the protective layer 54 on the second substrate 52, a continuous indium oxide-tin oxide layer was formed on the protective layer 54. The continuous indium oxide-tin oxide layer serves as the counterelectrode 29 described in connection with FIG. 3.

The liquid crystal material of E. Merck and the optical polarizing layers of Nitto Electric Industrial Company were used to complete the liquid crystal display device. Characteristics were as good as those of the liquid crystal display device according to the example illustrated with reference to FIGS. 10 through 13.

While this invention has thus far been described in specific conjunction with a single preferred embodiment thereof and various modifications and examples, it will now be readily possible for one skilled in the art to put this invention into effect in various other manners. For example, only one of the scan and the data decoders 31 and 32 may be used between the driver 25 and the electrodes 22 or 23. The nonlinear resistors 26 can be formed between the data electrodes 23 and a contiguous one of the first and the second principal surfaces of the liquid crystal layer 21. It is preferred, therefore, that the present invention be limited not by the specific disclosure herein, but only by the appended claims.

What is claimed is:

1. A matrix-type liquid crystal display device comprising a driver, a first and a second substrate, a liquid crystal layer between said substrates, a plurality of scan electrodes between said liquid crystal layer and said first substrate, a plurality of data electrodes between said liquid crystal layer and a preselected one of said substrates, and a scan decoder between said substrates and on said first substrate in a side-by-side relation to said liquid crystal layer, each of said scan electrodes and each of said data electrodes having a crossover which defines a respective picture element in said liquid crystal layer; said scan decoder comprising a plurality of bipolar coincidence scan circuit units having a plurality of scan input terminals connected to said driver and a plurality of scan output terminals connected to the respective scan electrodes, said bipolar coincidence scan circuit units each comprising a first plurality of active circuit elements connected in a first direction to predetermined ones of said scan input terminals and to one of said scan output terminals and a second plurality of active circuit elements connected in a second direction to preselected ones of said scan input terminals and to one of said scan output terminals and said first and second plurality of active circuits elements commonly connected to said one of said scan output terminals.

2. A matrix-type liquid crystal display device as claimed in claim 1, further comprising a data decoder between said substrate and on said preselected one of the substrates in a side-by-side relation to said liquid crystal layer and said scan decoder, said data decoder comprising a plurality of bipolar coincidence data circuit units having a plurality of data input terminals connected to said driver and a plurality of data output terminals connected to the respective data electrodes, said bipolar coincidence data circuit units each comprising a third plurality of active circuit elements connected in a third direction to predetermined ones of said data input terminals and to one of said data output terminals and a fourth plurality of active circuit elements connected in a fourth direction to preselected ones of said data input terminals and to one of said data output terminals and said third and fourth plurality of active circuit elements commonly connected to said one of said data output terminals.

3. In a matrix-type liquid crystal display device including a driver, a first and a second substrate, a liquid crystal layer between said substrates, a plurality of scan electrodes between said liquid crystal layer and said first substrate, and a plurality of data electrodes between said liquid crystal layer and a preselected one of said substrates, the improvement, in combination with the foregoing, comprising a scan decoder between said substrates and on said first substrate outwardly of said liquid crystal layer, said scan decoder having a first number of scan input terminals connected to said driver and a second number of scan output terminals connected to the respective scan electrodes, said first number being substantially logarithmically related to said second number, said scan decoder comprising a plurality of bipolar coincidence scan circuit units having said scan input terminals and said scan output terminals, said scan input terminals consisting of a source terminal and pairs of negative and positive scan terminals, said source terminal being for receiving from said driver a scan source voltage which varies from a scan reference voltage to a lower and a higher source voltage, said pairs of negative and positive scan terminals being for receiving pairs of negative-logic and positive-logic voltages from said driver, said bipolar coincidence scan circuit units each comprising pairs of negative and positive logic circuits connected to said source terminal and said pairs of negative and positive scan terminals and commonly to one of the scan output terminals, said negative logic circuits being responsive to said scan source voltage and said pairs of negative-logic and positive-logic voltages for supplying a negative-going scan electrode voltage to said one of said scan output terminals in a prescribed order when said scan source voltage is equal to said lower source voltage, said positive logic circuits being responsive to said scan source voltage and said pairs of negative-logic and positive-logic voltages for supplying a positive-going scan electrode voltage to said one of said scan output terminals in said prescribed order when said scan source voltage is equal to said higher source voltage.

4. In a matrix-type liquid crystal display device including a driver, a first and a second substrate, a liquid crystal layer between said substrates, a plurality of scan electrodes between said liquid crystal layer and said first substrate, and a plurality of data electrodes between said liquid crystal layer and a preselected one of said substrates, the improvement, in combination with the foregoing, comprising a scan decoder between said substrates and on said first substrate outwardly of said liquid crystal layer, said scan decoder having a first number of scan input terminals connected to said driver and a second number of scan output terminals connected to the respective scan electrodes, said first number being substantially logarithmically related to said second number; and further comprising a data decoder between said substrates and on the preselected one of said substrates in an offset positional relation to said liquid crystal layer and said scan decoder, said data decoder having a third number of data input terminals connected to said driver and a fourth number of data output terminals connected to the respective data electrodes, said third number being substantially equal to four times a square root of said fourth number, said data decoder being a bipolar coincidence data circuit having said data input terminals and said data output terminals, said bipolar coincidence data circuit comprising a plurality of bipolar coincidence data circuit units connected to the respective data output terminals and consisting of first through L-th groups of bipolar coincidence data circuit units where L represents a predetermined number, each group consisting of first through at most K-th bipolar coincidence data circuit units where K represents a predetermined integer, said fourth number being not less than a product of said predetermined number L and said predetermined integer K and being greater than another product of said predetermined number less one (L−1) and said predetermined integer K, said data input terminals consisting of a source terminal, first through L-th pairs of address terminals, and first through K-th pairs of data terminals, the bipolar coincidence data circuit units of said first through said L-th groups being connected to said source terminal and to said first through said L-th pairs of address terminals, respectively, said first through said K-th bipolar coincidence data circuit units of the bipolar coincidence data circuit being connected to said source terminal and to said first through said K-th pairs of data terminals, respectively.

* * * * *